No. 896,559. PATENTED AUG. 18, 1908.
A. A. LONGUEMARE.
AIR INLET REGULATOR FOR CARBURETERS.
APPLICATION FILED MAY 27, 1904.

Witnesses:

Inventor:
Adèle Amélie Longuemare
By Wm. B. Boulter,
Attorney

UNITED STATES PATENT OFFICE.

ADELE AMELIE LONGUEMARE, OF PARIS, FRANCE.

AIR-INLET REGULATOR FOR CARBURETERS.

No. 896,559.

Specification of Letters Patent.

Patented Aug. 18, 1908.

Application filed May 27, 1904. Serial No. 210,100.

*To all whom it may concern:*

Be it known that I, ADELE AMELIE LONGUEMARE, a citizen of the Republic of France, residing at Paris, in France, have invented certain new and useful Improvements in or Relating to Air-Inlet Regulators for Carbureters, of which the following is a specification.

This invention relates to an air inlet regulator with automatic adjustment, for admitting air to the mixing chamber of a carbureter.

The valve or regulator is chiefly characterized by the automatic adjustment parts of the regulator, arranged in a nozzle or chamber connected to the carbureter being constituted by two perforated disks applied one above the other, and arranged slightly above the air inlet openings made in the admission nozzle; these disks are arranged relatively to each other in such manner that the openings of one correspond to solid portions of the other and vice versa. The disk arranged immediately above the openings in the admission nozzle, with which openings coincide the openings in the disk, is fixed, while the second, upper disk, which is spring-controlled, is vertically movable, being guided in an exact manner above the first one, under the action of the suction produced in the carbureting chamber, so as to rise to a greater or lesser extent above the other, according to the magnitude of the suction, and to uncover entirely the openings of the latter disk, while remaining at a certain distance above them. The volume of air thus admitted, with the inlet openings of the fixed disk entirely open, is regulated, by the area of the air passage formed between the two disks, said area varying according to the degree of elevation of the movable disk corresponding to the suction in the carbureting chamber.

The air admission nozzle is preferably of a truncated cone shape, widening at the base, so that it and the disks arranged within it can be of sufficient diameter to make the total area of their orifices for the passage of air, correspond to that of the air inlet opening to the carbureting chamber.

The whole and the details of the device according to this invention are clearly shown in the accompanying drawing.

Figure 1:
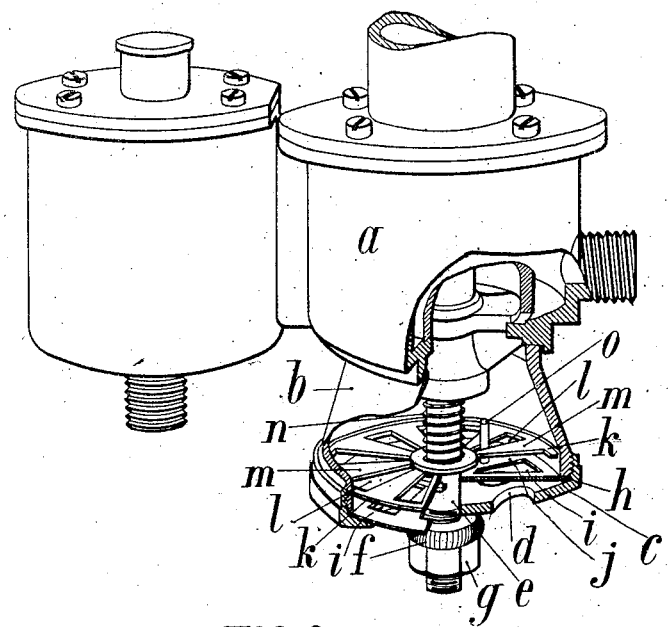
Figure 2:
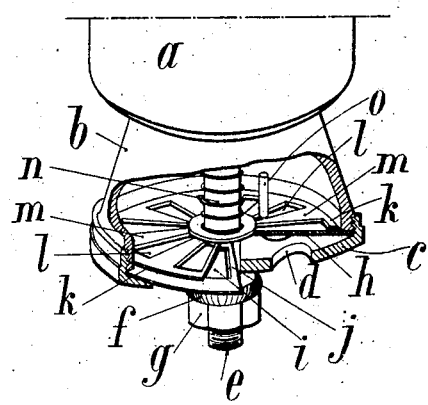

Figure 1 shows in perspective view the whole of a carbureter, some of the parts being broken away and the disks for regulating the admission of air being shown at a distance from each other to allow the passage of a quantity of air corresponding to a certain suction in the carbureting chamber. Fig. 2 is a partial view of the same parts, in the position in which the air inlet openings are closed.

As will be seen from the drawings, the carbureting chamber $a$ is connected to a truncated cone nozzle $b$, having a widened base closed by a cap or plate $c$ screwed on to it, and provided with air inlet openings $d$. Through the plate $c$ passes, in the center, a rod $e$ secured at its upper end to a spider in the open base of the carbureter $a$, said rod $e$ being employed, in conjunction with a milled nut $f$ and a lock-nut $g$, to fix the nozzle $b$ to the carbureting chamber $a$. In the nozzle $b$, a little above the cap $c$, is arranged a fixed disk $h$ provided with radiating or other openings $i$ separated by full intervals $j$. Above this disk is arranged another similar disk $k$ in such manner that its openings $l$ correspond to the full spaces $j$, and its full spaces $m$ to the openings $i$ in the disk $h$, and vice versa. Through the center of the two disks $h$ $k$ passes the rod $e$ which acts as a guide for the disk $k$ in its movement away from and nearer to the disk $h$; a small rod $o$ secured to the disk $h$ and passing through a corresponding opening $l$ in the disk $k$ completing this guidance and preventing the disk $k$ from turning relatively to the disk $h$. A spring $n$ is also arranged on the rod $e$, above the movable disk $k$, on which it acts with a tendency to apply it against the disk $h$. With this arrangement it will be seen that, when the very smallest suction takes place in the carbureting chamber $a$, and consequently in the nozzle $b$ forming continuation of it,—which depression must be sufficient to overcome the weak resistance of the spring $n$ and the weight of the movable disk $k$—the latter will be drawn away from the disk $h$ to a distance corresponding to the suction exerted completely uncovering the orifices $i$ through which air will pass through their full area, but then will pass through the area limited by the distance between the disks $h$ and $k$ and finally through the openings $l$ of the disk $k$, through the full area of the latter, and will enter the carbureting chamber $a$ through the nozzle $b$.

When the suction in the carbureting chamber $a$ and in the nozzle $b$ ceases the disk $k$ will be applied by the spring $n$ against the disk $h$, the respective air inlet openings $i$ $l$ of the two disks, thus becoming closed by the corresponding full spaces $l\,m$. In this way the admission of air to the carbureting chamber $a$ will be automatically regulated in exact accordance with the suction produced in the carbureter, said suction producing a greater or lesser separation of the disks with a corresponding greater or lesser air passage area between the said disks, the openings $i\,l$ of which, except when the disks lie one upon the other are always fully open for the passage of the air admitted.

In order to allow the total area for the admission of air in the nozzle $b$ to be at least equal, and preferably superior, to that of the air inlet in the carbureting chamber $a$, the nozzle is widened at the base corresponding to the size of the cap $c$ and disks $h$ and $k$ so that the number and the cross-sectional area of the orifices $d$, $i$ and $l$ of the cap and disks respectively shall give for each of those parts, a total area for the passage of air, at least equal to or even greater than the area of the inlet to the carbureting chamber $a$.

What I claim as my invention and desire to secure by Letters Patent is—

1. In an automatic air inlet regulator for carbureters the combination with a casing, a perforated cover closing one end of said casing, and a perforated fixed disk in said casing and parallel and adjacent to said cover, of a correspondingly perforated nonrotatable disk of a diameter equal to that of the interior of the casing and seated directly upon and parallel but relatively movable to said fixed disk, the solid portions of the movable disk covering and closing the perforations of the fixed disk and vice versa, a spring for pressing the movable disk upon the fixed disk, means for preventing lateral motion of the movable disk relatively to the fixed disk and a suction pipe connection between the casing and the motor, so that the quantity of air which penetrates is regulated by the suction of the motor acting on the upper surface of the movable disk to separate the two disks more or less from each other, substantially as set forth.

2. An automatic air inlet regulator for carbureters comprising a casing $b$, the perforated base $c$ thereof, a perforated disk $h$ fixedly mounted between the base and the end of the casing, a vertically movable non-rotatable perforated suction disk $k$, means for applying it directly against the fixed disk, and means for guiding it in its vertical movement, and a suction pipe connection between the casing and the motor, so that the quantity of air which penetrates is regulated by the suction of the motor acting on the upper surface of the movable disk to separate the two disks more or less from each other, substantially as set forth.

In testimony whereof I have signed my name to this specification in the presence of two subscribing witnesses.

ADELE AMELIE LONGUEMARE.

Witnesses:
 LOUIS SULLIGER,
 HANSON C. COXE.